United States Patent
Gikas et al.

(10) Patent No.: US 7,418,300 B2
(45) Date of Patent: Aug. 26, 2008

(54) SYSTEM AND METHOD FOR REUSING PROJECT ENGINEERING DATA

(75) Inventors: Diamantis Gikas, Nürnberg (DE); Ronald Lange, Fürth (DE); Ralf Leins, Ispringen (DE); Klaus Meusser, Fürth (DE); Jürgen Schmoll, Markt Berolzheim (DE)

(73) Assignee: Siemens Aktiengesellschaft, Munich (DE)

( * ) Notice: Subject to any disclaimer, the term of this patent is extended or adjusted under 35 U.S.C. 154(b) by 247 days.

(21) Appl. No.: 11/301,816

(22) Filed: Dec. 13, 2005

(65) Prior Publication Data

US 2006/0136497 A1 Jun. 22, 2006

(30) Foreign Application Priority Data

Dec. 21, 2004 (EP) .................................. 04030320

(51) Int. Cl.
*G05B 11/01* (2006.01)
*G05B 19/42* (2006.01)

(52) U.S. Cl. ............................ 700/18; 700/86; 715/967

(58) Field of Classification Search ................ 715/763, 715/967, 970, 965; 700/18, 86, 87, 88, 89
See application file for complete search history.

(56) References Cited

U.S. PATENT DOCUMENTS

| 5,150,308 | A | | 9/1992 | Hooper et al. |
| 5,651,108 | A | * | 7/1997 | Cain et al. ................... 715/763 |
| 6,565,429 | B1 | * | 5/2003 | Broberg ..................... 454/306 |
| 6,643,555 | B1 | | 11/2003 | Eller et al. |
| 6,684,220 | B1 | | 1/2004 | Pfeiffer et al. |
| 6,690,981 | B1 | * | 2/2004 | Kawachi et al. ............... 700/83 |
| 6,931,288 | B1 | * | 8/2005 | Lee et al. ...................... 700/86 |
| 7,134,081 | B2 | * | 11/2006 | Fuller et al. ................. 715/735 |
| 2002/0073094 | A1 | | 6/2002 | Becker et al. |

FOREIGN PATENT DOCUMENTS

EP 0 961 184 A2 12/1999

* cited by examiner

*Primary Examiner*—Thomas K Pham

(57) ABSTRACT

The invention relates to a system and a method for managing and/or providing elements, in particular technological objects. The system enables elements, in particular technological objects, to be reused in the development of a project engineering solution. Here, at least one element is created, in particular by a user of the system, with the at least one element serving as a template for the generation of an exemplar as an image or a plurality of exemplars as images of the element. The created elements are stored in a library and an exemplar of a stored element is created, the exemplar being used in the development of a solution, in particular an automation solution.

12 Claims, 3 Drawing Sheets

SYSTEM AND METHOD FOR REUSING PROJECT ENGINEERING DATA

CROSS REFERENCE TO RELATED APPLICATION

This application claims priority of the European application No. 04030320.8 EP filed Dec. 21, 2004, which is incorporated by reference herein in its entirety.

FIELD OF THE INVENTION

The invention relates to a system and a method for managing and/or providing elements, in particular technological objects.

BACKGROUND OF THE INVENTION

When engineering solutions are implemented, in particular in the automation systems environment, usually not everything is developed completely from scratch. Rather, a solution is typically developed on the basis of already existing partial solutions or modules. In the process parts of the existing solutions may be taken over in unmodified form, but it also happens more frequently that the existing partial solutions serve simply as a starting point for the subsequent developments. In this case the existing partial solutions are modified in the course of the further development.

An important factor within the framework of development projects is the extent to which already existing solutions can be reused. A high proportion of reusable elements reduces development costs and is therefore advantageous for manufacturers and customers.

Already prefabricated modules can be stored for reuse in the form of libraries, for example. In this case, however, a cross-industry concept which also encompasses different domains of the automation environment is not known at the present time. Development environments for MES projects, for example, have different libraries from those in the controls environment. Equally, there is currently no provision for making modifications when using reusable modules.

SUMMARY OF THE INVENTION

The object of the present invention is therefore to specify a system and a method which enables elements, in particular technological objects, to be reused in the development of a project engineering solution.

The object is achieved by a system for managing and/or providing elements, in particular technological objects, having first means for creating at least one element, in particular created by a user of the system, wherein the at least one element is provided as a template for producing an exemplar as an image or a plurality of exemplars as images of the element, having a library for storing at least the created elements and having second means for producing at least one exemplar of a stored element, with the at least one exemplar being provided so as to be used for developing a solution, in particular an automation solution.

The object is also achieved by a method for managing and/or providing elements, in particular technological objects, wherein at least one element is created in particular by a user of the system, wherein the at least one element serves as a template for producing an exemplar as an image or a plurality of exemplars as images of the element, at least the created elements are stored in a library and at least one exemplar of a stored element is produced, with the at least one exemplar being used for developing a solution, in particular an automation solution.

The invention is based on the knowledge that the reuse of already existing elements, technological objects or also partial solutions is of advantage in the course of the development of a project, more particularly in the automation environment. One of the aims here is to create the possibility for the centralized updating of correspondingly reusable elements or modules. In other words, when an element or module of said kind is inserted or updated automatically or by a user, the corresponding exemplars which were instantiated by the element or, as the case may be, module in the course of the generation of new solutions are updated. For this purpose essentially reusable elements, that is to say function modules representing technological objects, for example a valve or a pump in an installation, are stored in a library. Said elements, or also types, can be, as it were, replicated and then used by developers when creating new solutions. In the process images which are available as exemplars for the new solutions to be produced are then created from the elements from the library. What is involved in the creation of an exemplar as an image of an element is the instantiation of a type stored in the library.

Function modules or elements of the aforementioned type can relate, for example, to relatively small technological objects, e.g. pumps, valves or clamps. When developing a new automation solution a project engineer can resort to the use of said elements, which are stored in the library of the system. He can thus reuse elements that have already been developed in the past for further solutions. This leads to a reduction in the engineering overhead arising in the course of the development of an automation solution.

The elements that are essentially available for reuse within the framework of the system originate for example from a global library in which all the elements are stored that are potentially reusable for projects. When implementing a project, for example, a user can then open a project-specific library and add elements to this library from the global library or even from a plurality of global libraries with the aid of the means for creating an element. Within the framework of the project the corresponding elements are then available for reuse. Global libraries can be for example technological libraries associated with an engineering system. Said libraries can for example be supplied jointly with the engineering system. A global library can also be a library of a solution provider in which the solution provider stores function modules or elements developed in-house. A global library can for example also be the collection of function blocks or HMI interfaces specifically embodied for specific industries or sectors. For example, the function blocks and HMI interfaces in the automotive environment are structured differently from those in the process automation field.

In addition to the elements that a user can incorporate as part of his project library from the global libraries, possibly also from a plurality of different global libraries, the user can also obtain elements or, as the case may be, technological objects from other sources and insert them in his project library. For example he can also insert elements from other projects or newly created elements that are intended to be available specifically for the current project. In this case a project library is linked to the corresponding current project and consequently all the important operations that are applied in the project are contained in the library.

As a rule a single project library exists for a project. If elements or, as the case may be, technological objects from different global libraries or other sources are included in the project library, a substructure can be generated for example automatically by the user or even by the system by creating library folders for the elements from the different sources. This helps the user in navigating through the project library. In addition, this avoids conflicts in the naming of different library elements.

A further advantageous embodiment of the invention is characterized in that at least one element has characteristics and/or features identifiable for users. This enables the user to identify an element of the library even if it has been copied between different projects. Possible features for the element in this case include general attributes such as, for example, name, author, family, version. In addition there is an attribute called Type-ID. Even if the name or version is changed, this attribute ensures that it can be determined whether specific elements of a library are of the same type. Further information is also transmitted along with the attributes, for example on the relationship between different library elements, for example whether a library element is a new version of an already existing element. By this means the user retains an overview over the elements that are available to him via the library and as instances thereof in the projects.

A further advantageous embodiment of the invention is characterized in that the library is embodied in such a way that its structure can be specified by a user. This enables the user in the course of his engineering process to make use of a library with a structure that is optimally tailored to his purposes. A user can structure the library for his project in such a way that the relevant and related elements for his purposes are stored in corresponding folders. This facilitates the user's work within the framework of engineering projects.

A further advantageous embodiment of the invention is characterized in that the library has folders and/or subsets for storing specific elements, in particular elements of different origin. This allows the user to easily perform a structuring in such a way that the elements are copied into subsets or folders according to whether they originate from different global libraries or are even of some other origin. This enables an advantageous grouping of the elements. Equally it is possible that an element in the library can be subdivided further into "subelements" which represent different aspects, for example for control, for HMI or for diagnostics. In this way "sub-types", as it were, can be formed which are in each case instantiated in individual projects without the whole element having to be instantiated.

A further advantageous embodiment of the invention is characterized in that a bi-directional connection is provided between, in each case, the at least one element and the one or more exemplars. The bi-directional link or the connection between a library element and its instances enables the instances to be updated when a new version of an element of the library becomes available. Conversely, it is equally possible as a result of the bi-directional link to update the element or, as the case may be, the type if the exemplar or, as the case may be, the instance of the type has been modified. For this it is necessary that the instance or, as the case may be, the exemplar knows the type or, as the case may be, the element from which it is derived.

A further advantageous embodiment of the invention is characterized in that third means are provided for updating the exemplars of an element when the element has been modified and/or replaced. This enables all exemplars or, as the case may be, instances of a type to be updated if the source, that is to say the type in the project library, changes. In this case the update can be performed automatically when an element or, as the case may be, the type is modified or replaced. However, the update can also be performed such that it can only be executed by a user when an element has been updated. In this case, when an element is updated in the project library, the user is asked whether or not he would like to update the exemplars or, as the case may be, instances derived from the element or, as the case may be, type. The update can also be extended here only to individual instances or, as the case may be, exemplars. This affords the user of the system a maximum of flexibility in updating reusable function modules.

A further advantageous embodiment of the system is characterized in that fourth means are provided for updating elements of the library when an exemplar is modified. In this case, within the framework of the system, conversely when an instance is modified, the type or, as the case may be, element on which the instance is based can also be modified. Two possibilities are provided here within the framework of the system. The element or, as the case may be, type can likewise be modified when an instance in the project library is modified and will then be available in modified form for all other instances. However, when an instance is modified it is also possible, within the framework of the system according to the invention, to create a new element in the library, which element then exists as a parallel element to the original element. In this way a modification of elements results which is associated with a multiplication of the respective elements. Here, whether a new element is to be created or, as the case may be, whether the original element is to be modified and no new element created is a decision that is left to the user. If a new element is created, a new bi-directional link is likewise set up by the instance or, as the case may be, exemplar to the type, i.e. the new element or, as the case may be, function module so that the general updating mechanisms can also be applied once again within the framework of the system according to the invention.

A further advantageous embodiment of the invention is characterized in that fifth means are provided for updating the elements and/or exemplars when the library is modified. This provides the opportunity also to update many types or, as the case may be, elements and the exemplars instantiated from them at one and the same time when the entire library is updated.

A further advantageous embodiment of the invention is characterized in that the system is embodied as an engineering system for automation systems. In particular in the environment in which solutions are developed for automation systems it is evident that a great deal of time, effort and expense is required for the development of individual partial solutions or, as the case may be, technological objects. A particularly useful approach here is to make use of already existing elements, which results in a significant reduction in development costs.

BRIEF DESCRIPTION OF THE DRAWINGS

The invention will be described and explained in more detail below with reference to the exemplary embodiments depicted in the figures, in which.

DETAILED DESCRIPTION OF THE INVENTION

Figure 1:
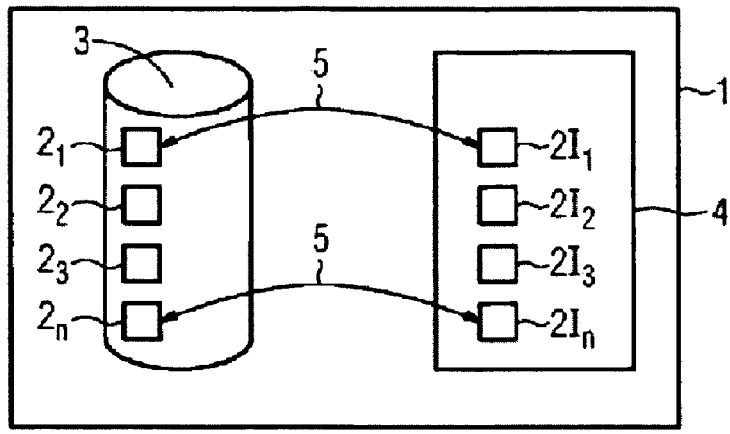
FIG. 1 is a schematic representation of the inventive system for managing or providing technological objects.

FIG. 1 shows a system 1 for managing and providing elements $2_1 \ldots 2_n$. The elements are stored in a library 3. The elements can be technological objects, for example pumps, valves or clamps. Within the framework of the system 1 the elements are available to a user for use in developing a solution 4, in particular an automation solution. For this purpose one or more exemplars $2I_1 \ldots 2I_n$ are created in each case as images of the elements. The exemplars are instances of the respective elements. The exemplars are available within the framework of the system 1 for developing an automation solution. The created exemplars or, as the case may be, instances are bi-directionally connected to the source elements, i.e. the types that serve as a basis for the instances. The connection takes the form of a link 5.

Within the scope of the system 1 according to the invention, a user creates one or more images of different types or, as the case may be, elements $2_1 \ldots 2_n$, that are stored in the library 3. These images are present as exemplars $2I_1 \ldots 2I_n$ in the form of an instance of the type. The exemplars can then be used for developing an automation solution. In this scenario the exemplars can be modified by the user with the result that the solution is specifically tailored to addressing the underlying problem. The bi-directional connection in the form of a link between the instances and the types is the basis for updating the respective instances, for example the instances of a function module or a technological object. The instances can only be updated accordingly if they have a connection to the type from which they were generated.

The elements $2_1 \ldots 2_n$ in the library 3 can originate from different global libraries or also from projects. The elements can also be generated by a user within the framework of the system and then inserted into the library. The elements in the library can have a user-defined structure, whereby they are included in different folders for example according to origin. The elements of the library can be used for reuse in different domains of an automation system. For example, an element has attributes which are relevant for use as part of a controls solution and the same element has other attributes which are relevant for use and reuse as part of, for example, an MES solution. By this means elements can be reused across different sectors of industry for the implementation of automation projects.

Figure 2:
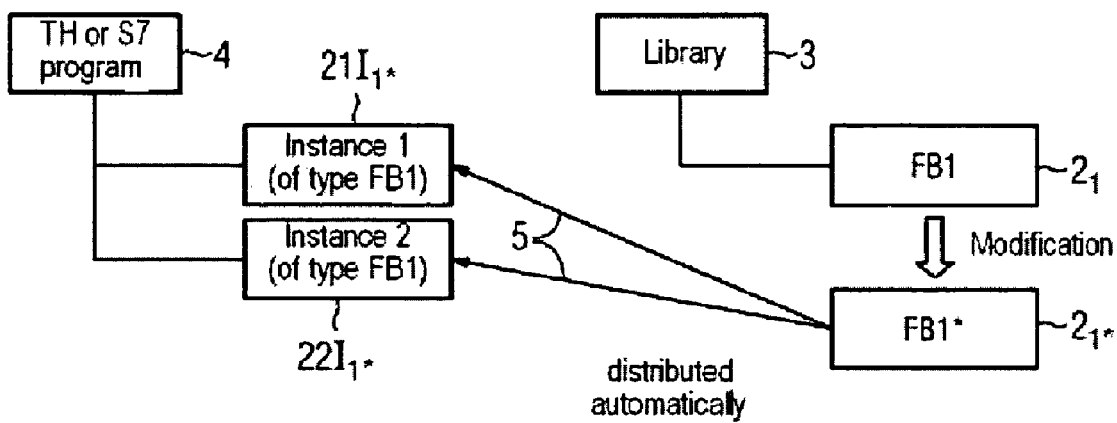
FIG. 2 shows how an element in the library is updated.

FIG. 2 shows the updating of the instances of an element $2_1$, for example of a function module, after the element $2_{1*}$ has been modified. As a result of the bi-directional link 5 the instances $2I_1, 22I_1$ in the solution 4 or, as the case may be, the engineering program will be automatically updated $2I_{1*}$, $22I_{1*}$ if the corresponding function module is modified in the library. The update can be performed here automatically or following an operator control action by a user, for example after selection of the instances of the function module that are to be updated. If a user does not wish to update all the instances of a type, then he has the opportunity here to make a selection.

Figure 3:
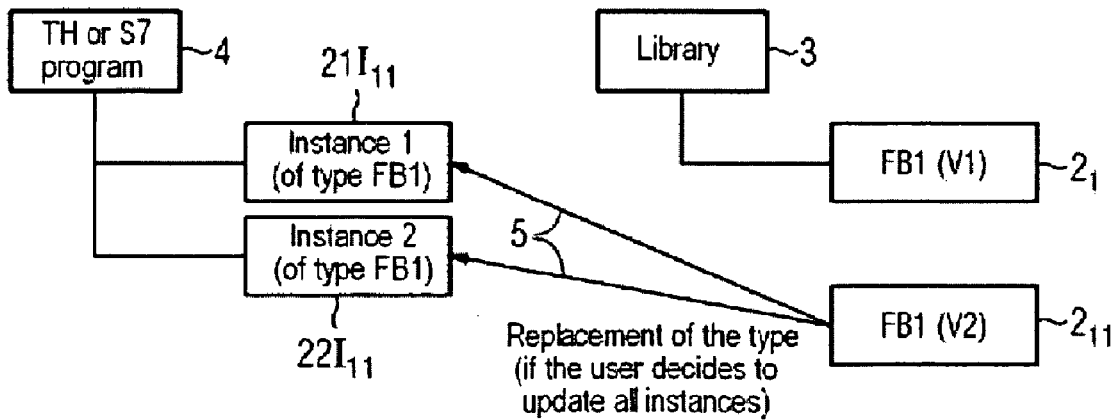
FIG. 3 shows how an element in the library is replaced.

FIG. 3 shows the replacement of a type $2_1$ in the library 3. If, for example, a new function module $2_{11}$ is inserted in the library in addition to the original element $2_1$, the instances $2I_1, 22I_1$ which were generated from the original function module or, as the case may be, original type $2_1$ will be replaced by the new function module $2_{11}$, resulting in updated instances or, as the case may be, exemplars $2I_{11}, 22I_{11}$. In this case the bi-directional connections 5 are likewise regenerated in the form of a link between the updated instances $2I_{11}, 22I_{11}$ and the new function module $2_{11}$. When a type is replaced by a new version or a different type, the user of the system can likewise select which exemplars or, as the case may be, instances of the type are to be updated and which will remain in the project on the basis of the old type. Only the instances which also correspond to the new function module or, as the case may be, new type are to be connected bi-directionally to said function module or type by means of the link 5.

Figure 4:
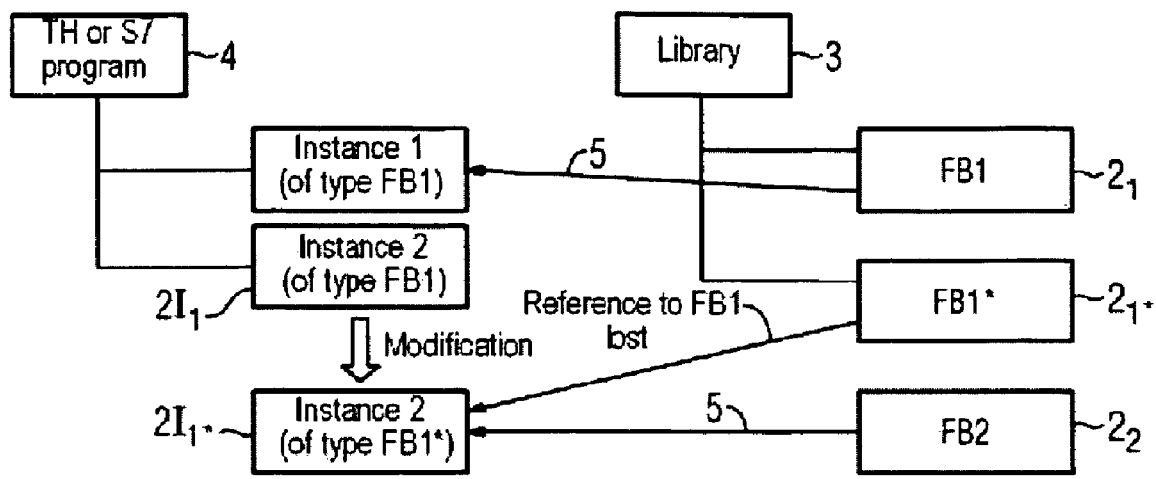
FIG. 4 shows how an element is modified via an exemplar.

FIG. 4 shows the modification of an element $2_1$ by way of the modification of the instance $2I_1$ of the element. In this case, for example, a modification $2I_{1*}$ is performed for an instance, i.e. an exemplar. The user of the system is then asked whether the associated type or, as the case may be, the element $2_1$ is also to be modified. If this is the case, the corresponding type or, as the case may be, function module $2_{1*}$ is modified. If the function module $2_1$ is not to be modified, a new type $2_2$ is created which is then available as an element for the modified instance. The modified instance $2I_{1*}$ is then connected to the new type $2_{1*}$ or, as the case may be, $2_2$ bi-directionally via the link 5. The modified instance loses its connection to the original type or, as the case may be, the original element $2_1$. If the original element is updated, the modified instance is accordingly no longer updated. An update takes place only when the newly created type or, as the case may be, element is modified.

Figure 5:
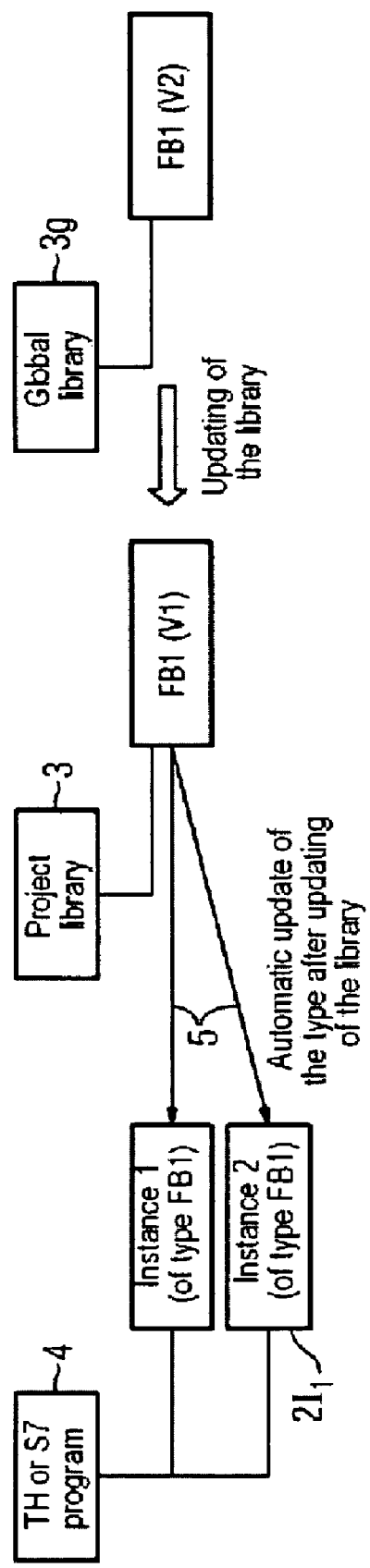
FIG. 5 shows a library update.

FIG. 5 shows the updating of the entire library. If, for example, new versions for the types or, as the case may be, elements used in the project library and present as function modules are available from a global library $3g$, then the corresponding elements are modified in the project library. Similarly, the instances or, as the case may be, exemplars that are dependent on the elements of the project library are updated. In this case too, the update can be performed automatically or under the control of a user.

Figure 6:
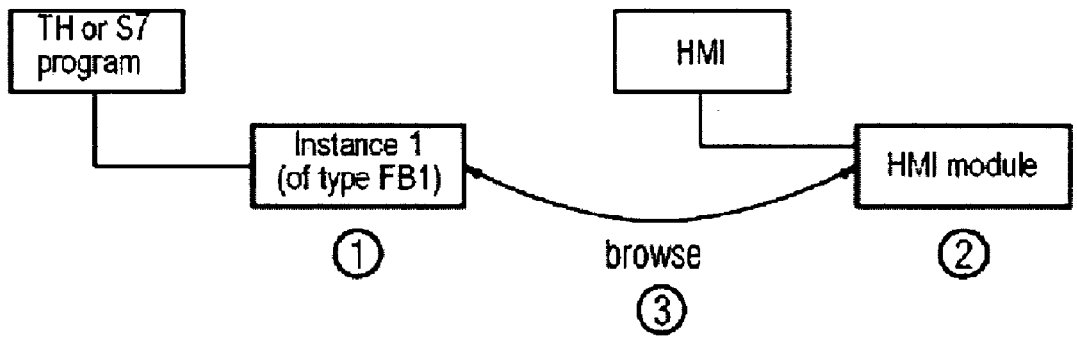
FIG. 6 shows the independent generation of library elements and subsequent connection.

FIG. 6 shows the independent generation of exemplars from a library element. If a plurality of exemplars can be instantiated separately from one another from one library element, then each is instantiated independently of the rest. For example, a function block of an element can be created in a controls program and in parallel therewith the corresponding HMI module for the function block can be instantiated in an HMI system, independently of one another. The connection between the two instances is established in that it is subsequently added using a browser. In this case only those instances that match one another are linked together.

Figure 7:
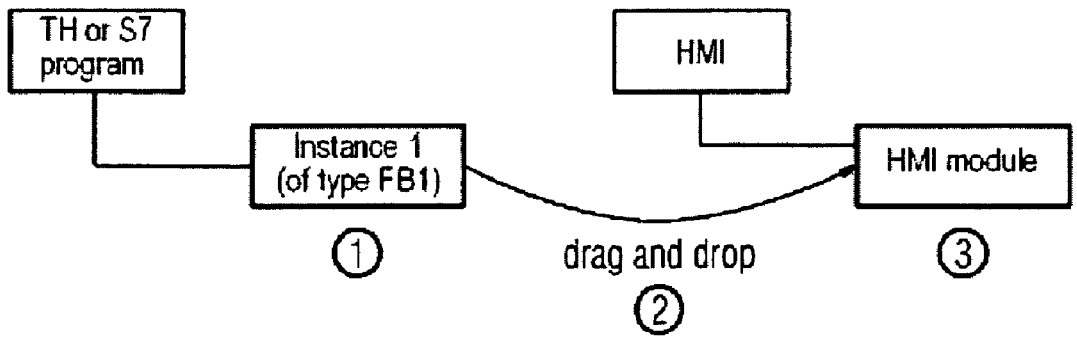
FIG. 7 shows the dependent generation of exemplars from the elements of the library.

FIG. 7 shows the instantiation of a function block from an element and the ensuing instantiation of an HMI module in the HMI environment. In this case the instantiation of the HMI module is generated by the function block being dragged into the HMI environment. The copying of the function block into the HMI environment causes a corresponding HMI module to be generated as an exemplar or, as the case may be, instance of the corresponding element in the library. In this case the connection between the function block as the first existing instance and the associated HMI module is generated automatically.

The invention claimed is:

1. A system providing reusable technological objects for development of project engineering solutions in automation systems, comprising:

a first component for the creation of at least one element for a first automation solution by a user of the system with the at least one element being provided as a template for generating an image or a plurality of images of the element to reuse the at least one element in one or more further automation solutions;

a library for storing the created elements to be available to generate images thereof for use in at least one further automation solution; and a second component for generating at least one image from the created element as stored in the library for the development of the one further automation solution and incorporation into the one further automation solution; and a third component for updating the image when the element is modified or replaced, the updating effected through a connection between the library and the one further automation solution.

2. The system as claimed in claim 1, wherein the at least one element has characteristics and/or features that are identifiable for the user.

3. The system as claimed in claim 1, wherein the library is embodied in such a way that its structure can be specified by a user.

4. The system as claimed in claim 1, wherein the library has a plurality of folders and/or subsets for storing specific elements.

5. The system as claimed in claim 1, wherein the connection is a bi-directional connection between a library location for the at least one element and the image provided in the one further automation solution.

6. The system as claimed in claim 1, wherein the third component for updating is embodied in such a way that the updating of the images is performed automatically when an element is modified and/or replaced.

7. The system as claimed in claim 1, wherein the third component for updating is embodied in such a way that the updating of the images, when an element is modified or replaced, can be performed by a user.

8. The system as claimed in claim 1, further comprising a fourth component for updating elements of the library when an image is modified.

9. The system as claimed in claim 8, wherein the fourth component for updating the elements of the library is embodied in such a way that an updating of the at least one element that is the source of a modified image is performed when the image is modified.

10. The system as claimed in claim 8, wherein the fourth component for updating the elements of the library is embodied in such a way that a new element is generated when the image is modified, with a new bi-directional connection being established between the new element and the modified image.

11. The system as claimed in claim 1, further comprising a fifth component for updating the elements and/or the images when the library is modified.

12. The system as claimed in claim 1, wherein the system is embodied as an engineering system for automation systems.

* * * * *